(12) United States Patent
Shien-Te et al.

(10) Patent No.: US 6,407,840 B1
(45) Date of Patent: Jun. 18, 2002

(54) POWER-SAVING INFRARED-DETECTING RECEIVING SYSTEM

(76) Inventors: Huang Shien-Te, F4, No.4 5, Chung-Po North Rd., Taipei; Chang Hui-Yu, No.34, Wu-Chuan 6 rd., Wu-Ku Industrial Zone, Wu-Ku Shiang, Taipei Hsien; Hu Yu-Min, F7, No.37, Chung-Shiao E. Rd. Sec. 5, Taipei, all of (TW)

( * ) Notice: Subject to any disclaimer, the term of this patent is extended or adjusted under 35 U.S.C. 154(b) by 0 days.

(21) Appl. No.: 09/296,052

(22) Filed: Apr. 21, 1999

(30) Foreign Application Priority Data

Jun. 19, 1998 (TW) .......................................... 87209840

(51) Int. Cl.$^7$ .............................................. H04B 10/00
(52) U.S. Cl. ....................... 359/142; 359/142; 359/189; 359/193; 348/734
(58) Field of Search ................................ 359/193, 189, 359/142; 348/734

(56) References Cited

U.S. PATENT DOCUMENTS 4,313,227 A * 1/1982 Eder
5,815,086 A * 9/1998 Ivie et al.
6,188,499 B1 * 2/2001 Majima
6,269,449 B1 * 7/2001 Kocis
6,300,880 B1 * 10/2001 Sitnik

* cited by examiner

Primary Examiner—Leslie Pascal
Assistant Examiner—Dzung Tran
(74) Attorney, Agent, or Firm—Pro-Techtor International Services

(57) ABSTRACT

A power-saving infrared-detecting receiving system composed of a micro-controller serving as a main control unit of the receiving system, an infrared module powered through the micro-controller for receiving a modulated infrared signal emitted by a remote controller used together with the receiving system, and an ultra-low power-consuming and independently powered predetector For detecting a low-frequency infrared front guide signal emitted by the remote controller. The receiving system is normally in a standby state in which only a very low power is consumed by the predetector to detect the infrared front guide signal emitted by the remote control for triggering the micro-controller. When the micro-controller is triggered, the receiving system enters into an operational state and sufficient current is supplied to the infrared module for it to receive a complete modulated infrared signal emitted by the remote controller.

4 Claims, 2 Drawing Sheets

POWER-SAVING INFRARED-DETECTING RECEIVING SYSTEM

BACKGROUND OF THE INVENTION

The present invention relates to a power-saving infrared-detecting receiving system, and more particularly to a system controlled by a micro-controller and including an infrared module for detecting infrared signal and an ultra-low power-consuming and dependently powered predetector for detecting an infrared front guide signal. Whereby the receiving system is normally in a standby state with most system power being cut off and only a very low power being consumed by the predetector to detect an infrared front guide signal emitted by a remote controller. The power consumed by the receiving system can therefore be largely reduced.

Following the technological advancements, most domestic electric appliances for daily use, such as TV sets, sound systems, air conditioning systems, curtain systems, etc., are designed to be conveniently remotely controlled with infrared signals. A remote controller emits such infrared signals. An infrared-detecting receiving system is provided in the individual electric appliance to receive such infrared signals and a micro-controller in the receiving system is notified to drive the electric appliance.

In a conventional infrared-detecting receiving system, power is supplied from mains to each individual unit system contained in the receiving system. Such individual unit systems usually include a micro-controller and an infrared module. Wherein, the micro-controller is the main control unit of the receiving system. The infrared module receives a modulated infrared signal emitted by a remote controller. The modulated infrared signal is demodulated into an infrared signal having correct frequency and sent to the micro-controller at where the demodulated infrared signal is judged for correctness. When the signal is judged and determined to be a correct infrared signal, the receiving system enters into an operating state and a driving circuit therein is notified to start controlling movements.

The infrared module included in the above-described conventional infrared-detecting receiving system includes many very complicate circuits. FIG. 1 is a block diagram of an infrared module of this type. As shown, the infrared module mainly includes an infrared diode 11, a current-voltage converter 12, a low-pass filter 13, an amplifier 14, a bandpass filter 15, an automatic gain controller 16, and a waveform regulator 17. When a remote controller used together with the receiving system emits a commercial modulated infrared signal (38 kHz carrier modulation), the infrared diode 11 in the infrared module receives the modulated signal which is converted by the current-voltage converter 12 from current into voltage. The low-pass filter 13 removes high-frequency noises from the signal which is then amplified by the amplifier 14. The 38 kHz carrier modulation signal is then filtered by the bandpass filter 15 and is regulated in its magnitude by the automatic gain controller 16. Thereafter, the waveform regulator 17 modifies the waveform of the signal and the resultant signal is output to the micro-controller.

In the above-described conventional infrared-detecting receiving system, the infrared module must be constantly supplied with current to detect and receive a modulated infrared signal from the remote controller at any time. Since the aforesaid infrared module is composed of many complicate circuits, it consumes considerably high power (usually from about 1.5mA to about 3mA). When general dry batteries are used as the main power supply for the receiving system, as in the case of a curtain control system, a large amount of dry batteries is consumed and frequent replacement of new batteries is required. Such constant and high consumption of power is, of course, not economical.

It is therefore tried by the inventor to develop an infrared-detecting receiving system which eliminates the drawback of high power consumption existing in the conventional infrared-detecting receiving system.

SUMMARY OF THE INVENTION

A primary object of the present invention is to provide a power-saving infrared-detecting receiving system that includes an ultra-low power-consuming and independently powered predetector for detecting an infrared front guide signal, in addition to a micro-controller and an infrared module. This arrangement allows the receiving system to be normally in a standby state with most of its control units in a power-off state and only a very small current being consumed by the predetector for detecting an infrared front guide signal emitted by a remote controller at any time.

To achieve the above object, the present invention provides a receiving system which mainly includes a micro-controller serving as a main control unit in the receiving system. The micro-controller controls the supply of current to an infrared module for the same to receive a modulated infrared signal emitted by a remote controller used together with the receiving system. The received modulated infrared signal is demodulated into infrared signals of correct frequency and sent to the micro-controller at where the demodulated infrared signals are judged for their correctness. If the signals are determined to be correct, the receiving system enters into an operating state and a driving circuit thereof is notified to start controlling movements. The receiving system of the present invention also includes an ultra-low power-consuming and independently powered predetector which is capable of detecting a low-frequency infrared front guide signal emitted by the remote controller. When an infrared front guide signal is detected, a trigger signal is sent from the predetector to the micro-controller. At this point, the micro-controller enters into an operating mode and turns on system power to supply current to the infrared module for the latter to detect and receive a complete modulated infrared signal. That is, the receiving system can be normally in a standby state to turn off the system power with only a very low power supplied to the predetector to detect and receive an infrared front guide signal emitted by the remote controller. Whereby, an ultra-low power consumption is needed by the receiving system of the present invention.

BRIEF DESCRIPTION OF THE DRAWINGS

The above and other objects of the present invention as well as the features and functions thereof can be best understood by referring to the following detailed description of the preferred embodiments and the accompanying drawings, wherein.

DETAILED DESCRIPTION OF THE PREFERRED EMBODIMENTS

Figure 2:
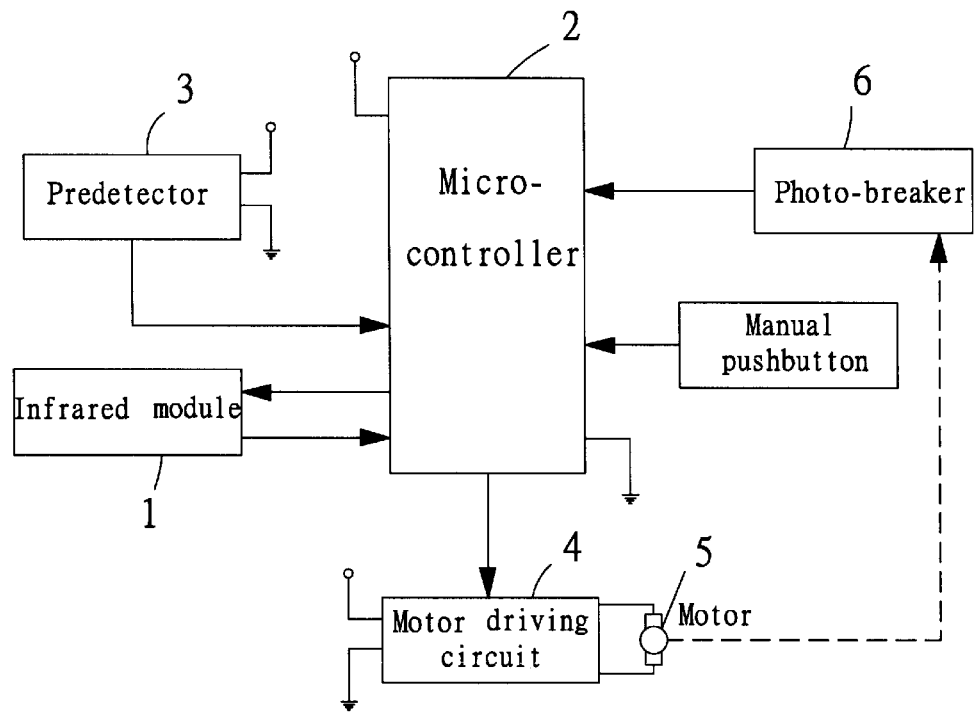
FIG. 2 is a block diagram of an infrared-detecting receiving system according to the present invention for use to control a curtain system.

Please refer to FIG. 2 in which a block diagram of a receiving system according to an embodiment of the present invention for controlling a curtain system is shown. As shown, the receiving system mainly includes a micro-controller 2 which is a main control unit of the receiving system. The micro-controller 2 controls the supply of current to an infrared module 1 in the receiving system for receiving a modulated infrared signal emitted by a remote controller used together with the receiving system. The received modulated infrared signal is demodulated into an infrared signal of correct frequency and sent to the micro-controller 2 at where the signal is judged for its correctness. If the demodulated signal is determined to be a correct infrared signal, the infrared-detecting receiving system enters into an operating state and a motor driving circuit 4 therein is notified to drive a motor 5 of the curtain system for the latter to move in response to the signal. The micro-controller 2 monitors the rotational speed of the motor 5 via a photo-breaker 6 while the motor 5 rotates.

Figure 1:
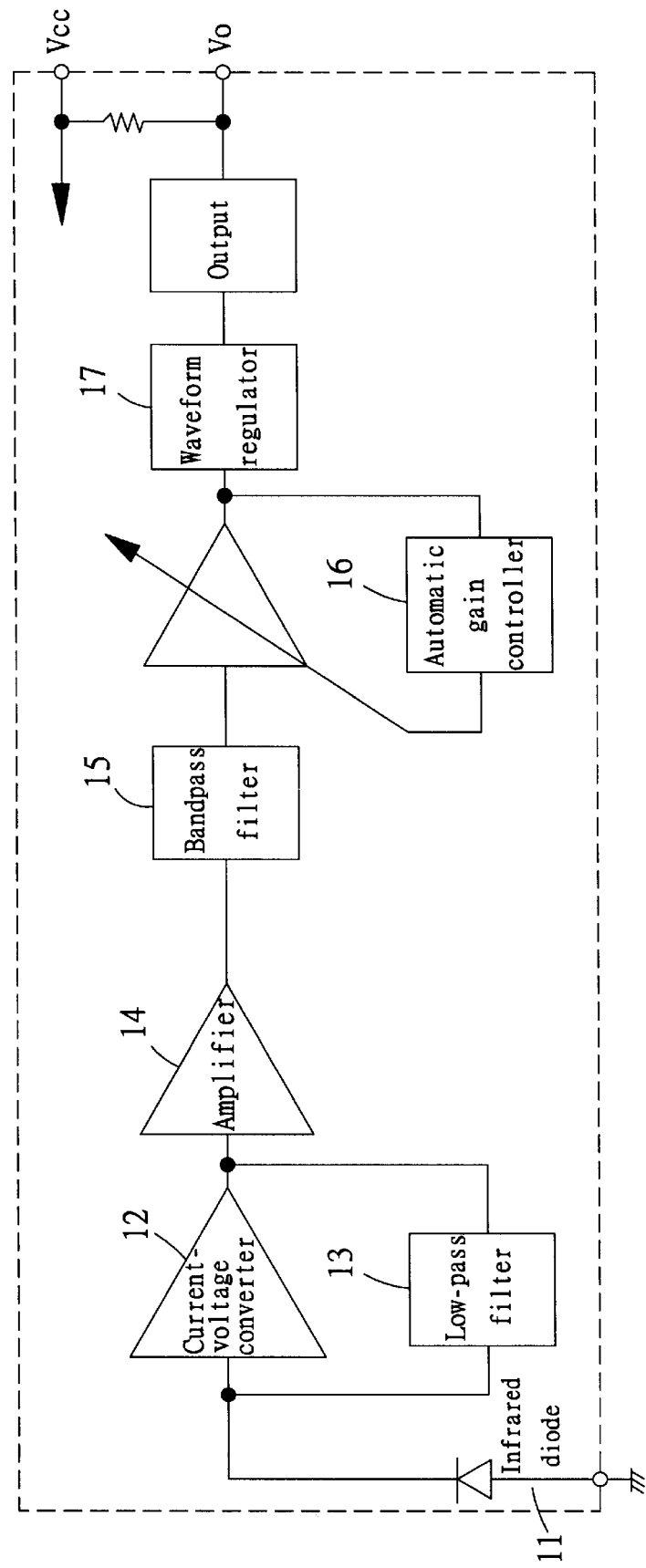
FIG. 1 is a block diagram of an infrared module.

In the above-described embodiment, since the infrared module 1 has a configuration similar to that of the conventional infrared module as shown in FIG. 1, it is not repeatedly described herein.

As shown in FIG. 2, the infrared-detecting receiving system of the present invention also includes a predetector 3 which is composed of an ultra-low power-consuming amplifier and can be considered as a simplified low power-consuming infrared module.

Figure 3:
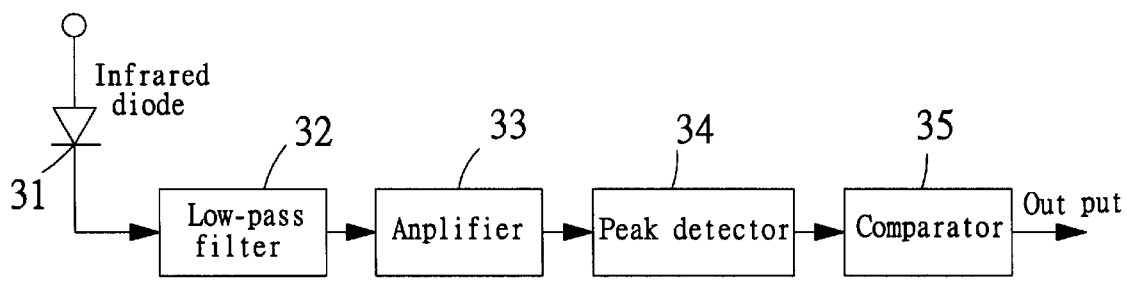
FIG. 3 is a block diagram of a predetector according to the present invention.

Please now refer to FIG. 3 which is a block diagram of the predetector 3 of the present invention. As shown, the predetector 3 is composed of an infrared diode 31 which receives an infrared front guide signal emitted by the remote controller. The received signal is filtered by a low-pass filter 32 to remove high-frequency noises and then amplified by an ultra-low power-consuming amplifier 33. The amplified signal is then modified to a square-wave signal via a peak detector 34 and a comparator 35. The resultant signal is then output to the micro-controller 2.

Wherein, since the ultra-low power-consuming amplifier 33 sacrifices bandwidth for achieving ultra-low power consumption, interference due to environmental noises can not be completely eliminated and general commercial 38 kHz modulated infrared signals can not be accepted, neither. Therefore, it is necessary to use an infrared bandwidth as low as only a few kHz if the predetector 3 having such a simplified structure is to be used. For this purpose, the infrared signal emitted by the remote controller must be modified to meet the requirement of very low kHz. As a result, the remote controller used together with the infrared-detecting receiving system of the present invention must be able to emit two types of signals, that is, a low-frequency (3 kHz is set in this embodiment) infrared front guide signal and a 38 kHz infrared modulating signal that alternately appear.

In the above-described embodiment, the receiving system will be in one of three states depending on its power consuming condition. When the receiving system is in a first state, that is in a standby state, only a very small amount of current is supplied to the predetector 3 while all other system units in the receiving system are powered off. At this point, the micro-controller 2 is in a low power-consuming mode with a power consumption about 1 $\mu A$. When an infrared remote control signal is generated, the predetector 3 will send a trigger signal to the micro-controller 2 which will immediately enter into an operational mode on receipt of the trigger signal and turn on the system power, so that current is supplied to the infrared module 1 for the latter to receive a complete modulated infrared signal. The receiving system is now in a second state, that is a detecting state. If the modulated infrared signal is not demodulated into a correct infrared signal within a set time period (60 ms, for instance) when the receiving system is in the detecting state, the receiving system will return to the standby state. On the contrary, if the demodulated infrared signal is demodulated into a correct infrared signal, the receiving system will enter into a third state, that is an operational state. In this operational state, the motor driving circuit 4 of the receiving system will be notified to drive the motor 5, so that the motor 5 operates to cause the curtain system to move in response to the remote control signal. Since the micro-controller 2 controls the power to all system units other than the predetector 3, the receiving system in the standby state almost consumes no power. Therefore, a power-saving effect can be achieved by using the present invention.

The purpose for the present invention to incorporate the conventional infrared module 1 is to eliminate interference due to noises. Such conventional infrared module 1 can demodulate general commercial modulated infrared signals (38 kHz carrier demodulation) for the micro-controller 2 to determine whether the signal data is correct or not. Meanwhile, the infrared module 1 allows control of multiple functions at the same time. In particular, when the predetector 3 is unexpectedly triggered by a noise, the receiving system itself can still maintain in a stable condition.

The infrared front guide signal sent by the remote controller used together with the present invention is used to trigger the predetector 3, causing the micro-controller 2 to turn on the system power. On the other hand, the modulated infrared signal emitted by the remote controller is demodulated by the infrared module 1 and then decoded by the micro-controller 2. With these arrangements, the whole infrared-detecting receiving system is normally in the standby state in which only an ultra-low power of about 40 $\mu A$ is consumed by the receiving system. Even if the predetector 3 is triggered one hundred times during a period of 24 hours, the average power consumption of the receiving system is increased only by 1 $\mu A$. Meanwhile, the stability of the receiving system of the present invention is not affected even in a highly interfered environment. Another advantage of the present invention is that it is a real-time system and therefore does not have the problem of time delay as will be found in general receiving system with cyclic power switch.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A power-saving infrared-detecting receiving system, comprising a micro-controller serving as a main control unit of said receiving system, an infrared module being powered through said micro-controller, and an ultra-low power-consuming and independently powered predetector;

said infrared module being capable of receiving a modulated infrared signal emitted by a remote controller used together with said receiving system and demodulating said modulated infrared signal into an infrared signal of correct frequency that is then sent to said micro-controller;

said micro-controller determining whether said demodulated infrared signal is a correct signal, and actuating said receiving system to enter into an operational state if said demodulated infrared signal is determined to be a correct signal; and a motor driving circuit in said receiving system in said operational state being notified to start different controlling movements; and said ultra-low power-consuming and independently powered predetector being capable of sending a trigger signal to said micro-controller on detecting of a low-frequency infrared front guide signal emitted by said remote controller, said trigger signal enabling said micro-controller to enter into an operational mode and power on said receiving system for said infrared module to detect and receive a complete modulated infrared signal;

whereby said receiving system can be normally in a standby state in which all system units thereof other than said predetector are powered off and only a very small current is needed by said predetector to detect and receive an infrared front guide signal emitted by said remote controller at any time.

2. A power-saving infrared-detecting receiving system as claimed in claim 1, wherein said predetector comprises an infrared diode for receiving said infrared front guide signal emitted by said remote controller, a low-pass filter for eliminating high-frequency noises from said infrared front guide signal, an amplifier for amplifying a resultant signal from said low-pass filter, and a peak detector and a comparator for modifying said amplified signal into a square-wave signal which is then output to said micro-controller.

3. A power-saving infrared-detecting receiving system as claimed in claim 2, wherein said infrared front guide signal and said infrared modulated signal are alternately emitted by said remote controller.

4. A power-saving infrared-detecting receiving system as claimed in claim 1, wherein said infrared front guide signal and said infrared modulated signal are alternately emitted by said remote controller.

* * * * *